US006442563B1

(12) United States Patent
Bacon et al.

(10) Patent No.: US 6,442,563 B1
(45) Date of Patent: Aug. 27, 2002

(54) WORKFLOW MANAGEMENT SYSTEM, METHOD, AND MEDIUM THAT MORPHS WORK ITEMS

(75) Inventors: Ian D. Bacon, Manassas; Matthew M. Lindenfelser, Vienna; Edwin C. Sheffield, Jr., Leesburg, all of VA (US)

(73) Assignee: Enterworks, Ashburn, VA (US)

( * ) Notice: Subject to any disclaimer, the term of this patent is extended or adjusted under 35 U.S.C. 154(b) by 0 days.

(21) Appl. No.: 09/070,639

(22) Filed: Apr. 30, 1998

(51) Int. Cl.[7] ............................................... G06F 17/30
(52) U.S. Cl. ..................... 707/103; 707/10; 707/104; 709/201; 709/203; 705/8; 705/9
(58) Field of Search ................................ 707/103, 1, 3, 707/4, 10, 104; 705/8, 9; 709/203, 201

(56) References Cited

U.S. PATENT DOCUMENTS

| 4,503,499 A | 3/1985 | Mason et al. ................ 709/101 |
| 5,181,162 A | 1/1993 | Smith et al. ................. 707/530 |
| 5,216,603 A | 6/1993 | Flores et al. .................... 704/1 |

(List continued on next page.)

OTHER PUBLICATIONS

Alonso et al. (1997) *Proc. IEEE Int. Workshop on Research Issues in Data Eng.*, pp. 82–90.
Bauer et al. (1997) *Proc. of the IFCIS Int. Conf. on Cooperative Information Systems*, pp. 99–108.
Ceri et al. (1997) *Proc. IEEE Int. Workshop on Research Issued in Data Eng.*, pp. 76–79.
Huang et al. (1996) *Proc. of the 1996 ESDA* 79(7):123–129.
Workflow Management Coalition: *The Workforce Reference Model*, Issue 1.1 (Nov. 29, 1994).
Workflow Management Coalition: Workflow Client Application (Interface 2) Application Programming Interface (WAPI) Specification, Version 1.2 (Oct. 1, 1996).
Workflow Management Coalition: *Terminology& Glossary*, Issue 2.2 (Jun. 1996).
Workflow Management Coalition. Oct. 2, 1996. *Workflow Management Application Programming Interface (Interface 2) Specification*, Document No. TC00–0009.
Workflow Management Coalition. Jun. 1996. *The Workflow Management Coalition Specification*, Document Status Issue 2.0.
Hollingsworth, David. Jan. 19, 1995. *Workflow Management Coalition The Workflow Reference Model*; Workflow Management Coalition; Document No. TC00–1003; Document Status –Issue 1.1.
U.S. patent application Ser. No. 09/070,735, Bacon et al., filed Apr. 30, 1998.
U.S. patent application Ser. No. 09/070,636, Bacon et al., filed Apr. 30, 1998.

*Primary Examiner*—Jack Choules
*Assistant Examiner*—Cheryl Lewis
(74) *Attorney, Agent, or Firm*—Hale and Dorr LLP

(57) ABSTRACT

A workflow system for distributing work items to actors so that the actors may perform an activity within a defined workflow process. A server interprets the workflow process and facilitates the scheduling and routing of work items in the system to an actor. Each work item has a set of work item contents data. Morphing logic determines which data is needed by an actor to which a work item has been scheduled and morphs a work item so that the actor receives only the data from the work item contents that the actor needs. Particular implementations are described for client actors and agent actors. A particular embodiment uses Java and distributed object along with application specific and system default HTML pages to display work item contents data to a participant.

15 Claims, 9 Drawing Sheets

U.S. PATENT DOCUMENTS

| | | | |
|---|---|---|---|
| 5,239,617 A | 8/1993 | Gardner et al. | 706/11 |
| 5,301,320 A | 4/1994 | McAtee et al. | 705/9 |
| 5,535,322 A | 7/1996 | Hecht | 705/1 |
| 5,535,323 A | 7/1996 | Miller et al. | 345/338 |
| 5,564,044 A | 10/1996 | Pratt | 709/106 |
| 5,581,691 A | 12/1996 | Hsu et al. | 714/15 |
| 5,666,490 A | 9/1997 | Gillings et al. | 709/238 |
| 5,689,625 A | 11/1997 | Austin et al. | 358/1.15 |
| 5,710,921 A | 1/1998 | Hirose | 709/106 |
| 5,734,837 A | 3/1998 | Flores et al. | 705/7 |
| 5,754,857 A * | 5/1998 | Gadol | 395/680 |
| 5,799,297 A | 8/1998 | Goodridge et al. | 707/1 |
| 5,826,239 A * | 10/1998 | Du et al. | 705/8 |
| 5,837,388 A | 11/1998 | Doko et al. | 428/654 |
| 5,867,824 A * | 2/1999 | Saito | 705/9 |
| 5,923,885 A * | 7/1999 | Johnson et al. | 395/712 |
| 5,930,512 A * | 7/1999 | Boden et al. | 717/10 |
| 5,987,513 A * | 7/1999 | Prithviraj et al. | 709/223 |
| 5,933,144 A * | 8/1999 | Alcorn | 345/347 |
| 5,937,411 A * | 8/1999 | Becker | 707/103 |
| 5,999,911 A | 12/1999 | Berg et al. | 705/9 |
| 6,012,067 A * | 1/2000 | Sarkar | 707/103 |
| 6,014,135 A | 1/2000 | Fernandes | 345/744 |
| 6,044,380 A * | 3/2000 | Gerard et al. | 707/103 |
| 6,067,477 A | 5/2000 | Wewalaarachchi et al. | 700/83 |
| 6,078,982 A | 6/2000 | Du et al. | 710/200 |
| 6,092,079 A * | 7/2000 | Gerard et al. | 707/101 |
| 6,192,165 B1 | 2/2001 | Irons | 382/306 |

* cited by examiner

WORKFLOW MANAGEMENT SYSTEM, METHOD, AND MEDIUM THAT MORPHS WORK ITEMS

CROSS-REFERENCE TO RELATED APPLICATION

This application is related to the following applications, all of which arc filed on the same date as this application, all of which are assigned to the assignee of this application, and all of which are hereby incorporated by reference in their entirety:

Workflow Management System, Method, and Medium with Distributed Subflows (U.S. aplication. Ser. No. 09/070, 635 Abandoned; and Workflow Management System, Method, and Medium with Personal Subflows (U.S. aplication. Ser. No. 09/070.636 pending.

BACKGROUND OF THE INVENTION

1. Field of the Invention

The present invention relates generally to computerized workflow management and, more particularly, to a workflow management system and method that morphs work items.

2. Discussion of Related Art

"Workflow" is the automation of a business process, in whole or part, during which documents, information, or tasks are passed from one "activity" to another according to a defined "business process." A "business process" is a defined set or sequence of procedures or activities that collectively realize a business objective or policy goal. An "activity" is a description of a piece of work that forms one logical step within a business process or workflow performed by an "actor." An activity may involve human resources (i.e., a "participant") to support the execution of the activity, or it may involve automatic execution via a software "agent." The "work item" represents the life cycle, or state, of a body of work as it passes through a workflow. A "workflow management system" provides procedural automation of a business process by managing the sequence of work activity and by invoking the appropriate human and/or computer resources associated with the various activity steps involved in the defined business process.

Over the years, many workflow management products have been introduced often particularly focusing on functional needs of a specific business processes. These systems are largely incompatible with other workflow systems, thus making it extremely difficult and costly for one workflow management system, for example, to interoperate with another workflow management system. This is undesirable because often the systems that cannot interoperate are considered related in a business sense.

To address the above, the Workflow Management Coalition (WfMC) was established with a stated purpose of developing specifications to facilitate interoperability between heterogeneous workflow products and to improve integration of workflow applications with other information technology (IT) services, such as electronic mail and document management. To this end, the WfMC developed and published a workflow reference model which, among other things, outlines a generic workflow model and various interfaces. See DAVIDHOLLINGSWORTH, WORKFLOW MANAGEMENT COALITION, THE WORKFLOW REFERENCE MODEL, Document No. TC00-1003, which is hereby incorporated by reference in its entirety. The Coalition has further provided a specification of terminology and of the various interfaces. See, respectively, WORKFLOW MANAGEMENT COALITION, TERMINOLOGY AND GLOSSARY, Document No. WfMC-TC-1011, which is hereby incorporated by reference in its entirety, and WORKFLOW MANAGEMENT COALITION, WORKFLOW CLIENT APPLICATION (INTERFACE 2) APPLICATION PROGRAMMING INTERFACE (WAPI) SPECIFICATION, Document Number WfMC-TC-1009, which is hereby incorporated by reference in its entirety. The various standards and specifications are silent on implementation details of any of the various components and primarily focus on interfaces. Moreover, to the extent that interfaces are discussed with any specificity beyond an abstract model, they are discussed with reference to the 'C' programming language.

In conventional workflow management systems, a work item is a representation of a document or information being passed through a business process. Although the contents of that document may change along its transition from activity to activity, the "type" of the item remains unchanged. For example, if a word processing document is being routed through a workflow, each participant or agent receives a copy of the word processing document. In short, conventional systems are document- or form-centric.

For example, Lotus Notes, available from IBM, is a collaborative mail-based system in which specific documents arc passed through a proprietary interface and modified by an end-user and then passed to a next end-user. The same document is in use at all times. InConcert, available from InConcert, is an object-based system having a proprietary messaging protocol in which each action is associated with a single, specific display type. To transform information from one display to another requires manual intervention. Metro, available from Action Technologies, is a document and forms passing system in which the forms may be displayed in a browser.

The conventional systems require that each entity involved in a given workflow must understand and be able to process the data type that is being used by all other entities. This places restrictions on the types of entities that may be incorporated into a workflow. If another data type is needed a separate workflow must be initiated. This is not only inefficient but introduces its own inherent interoperability concerns.

Thus, it is an object of the invention to provide a workflow management system and method that overcomes the above disadvantages. It is another object of the invention to provide a workflow management system and method that morphs work items into a type or form needed by a given actor.

SUMMARY

Preferred embodiments of the invention provide a workflow management system that improves interoperability by allowing activity applications, i.e., either an application to interact with a participant or an agent, to be developed without regard to the actual work item contents. The system detects the work item contents data that is needed by an activity and morphs a work item that has been routed to that activity into a form having only the data that is needed by the activity. The work item may be dynamically modified not only to change variable values in the work item contents but to include new components in the contents. Certain embodiments associate activity-dependent HTML pages with an activity so that the eventual display of a morphed work item may appear as completely different forms or documents from one activity to the next.

Under a preferred embodiment, a workflow system distributes work items to actors so that the actors may perform an activity within a defined workflow process. The system includes a server and morphing logic. The server interprets the workflow process and facilitates the scheduling and routing of work items in the system. Each work item has a set of work item contents data. The morphing logic determines which data is needed by an actor to which a work item has been scheduled and morphs a work item so that the actor receives only the data from the work item contents that the actor needs.

DETAILED DESCRIPTION

The present invention provides certain embodiments of a workflow management system and method that morphs work items. The morphing of work items provides several efficiencies and facilitates interoperability among workflow systems and associated applications. For example, what would conventionally be performed with disparate workflow systems may now be performed within a single system. Under preferred embodiments, an actor will receive a "morphed" work item having only the data that that actor requires to perform its corresponding activity. The actor may inject new work items into the workflow, modify the work item it receives, use the work item it receives without altering it, or dynamically change the structure of the work item by adding new components to it. Preferred embodiments use Java technology thus further improving interoperability and distribution.

1. System Overview

Figure 1:
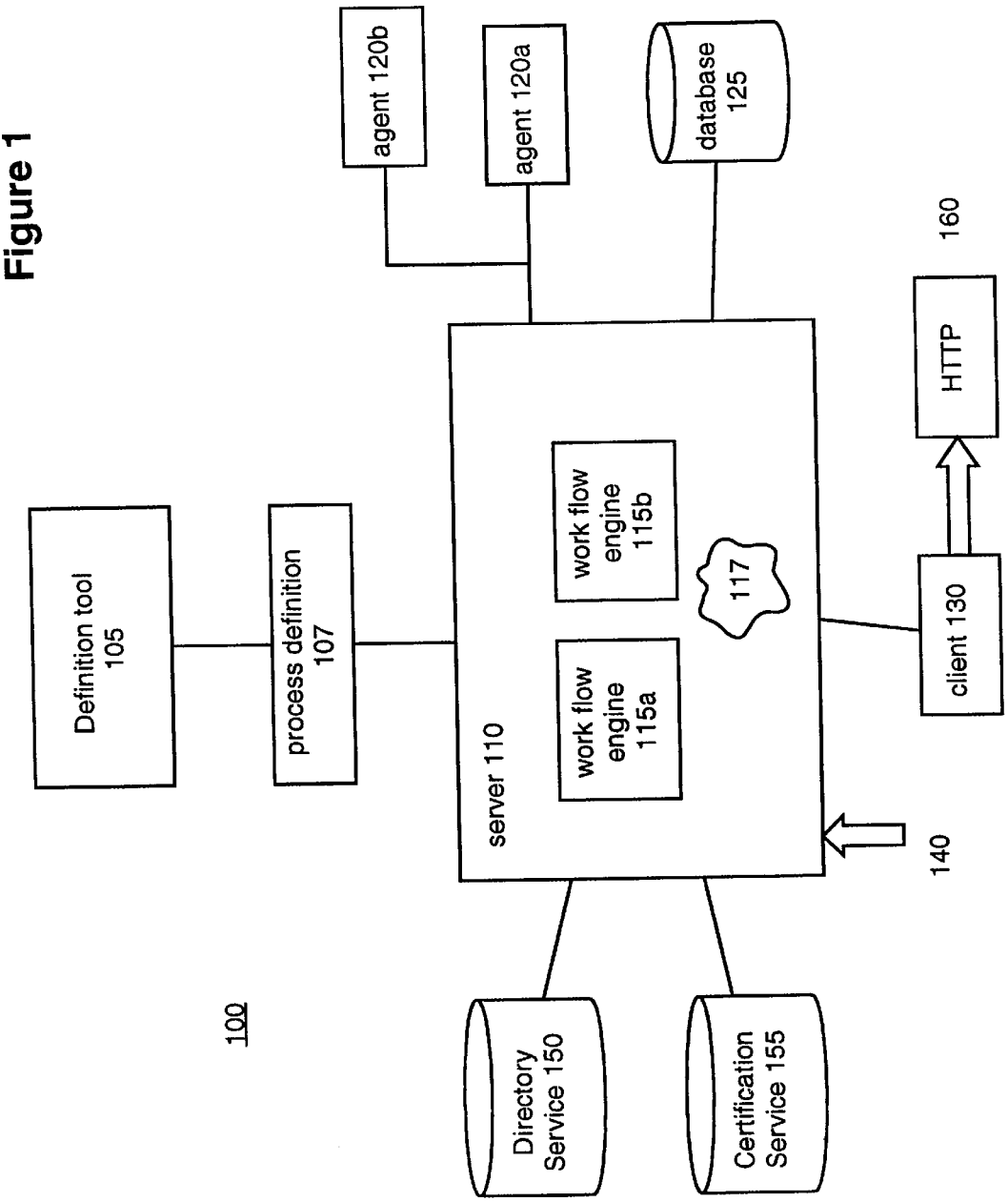
FIG. 1 is a system diagram of an exemplary embodiment of the invention.

FIG. 1 shows a workflow management system 100. The primary components are process definition tool 105, server 110 (having engines 115a–b), agents 120a–b, database 125, and client 130. Preferred embodiments further include administration interface 140, LDAP services 150, certificate services 155, and HTTP server 160.

The process definition tool 105 is used to create a process definition 107 that represents the desired business process in a computer-interpretable form. The definition tool 105, for example, may have a graphical user interface (GUI) that may be used to specify a business process by dragging and dropping various iconic representations of the various activities, the participants, agents, and interrelationships involved in a given process. The interrelationships may follow those specified in the WfMC model, such as OR-split, OR-join, AND-split, and AND-join. The process definition 107 may further include information identifying starting and completion conditions for the various activities. The definition tool 105 may also include capabilities to check for certain functional and semantic correctness or validity of the specified process definition 107. Once defined, the process definition 107 may be stored in the database 125 for later use when executing a workflow.

The server 110 effectively interprets the process definition 107 and cooperates with the clients 130 and agents 120 to schedule the sequence of the various process definition-specified activities. More specifically, the server 110 may include one or more engines 115, in which each engine individually or with a co-operating engine schedules the sequence of activities of a given process 107 with the cooperation of an agent 120 or client 130. Moreover, each engine 115 together with cooperating agents and clients makes scheduling decisions from considering (1) the definition 107, (2) status information from agents 120 and clients 130 (e.g., completion status of an activity), and (3) other external and/or internal events. Upon determining that an activity may be started, the engine 115 routes a given work item 117 to the appropriate actors, such as agents 120, clients 130, or possibly a workgroup (not shown) where an activity is performed. For certain types of activity interrelationships, the engine 115 may clone a work item 117 and route cloned work items to several actors.

Agent 120 is a software entity responsible for autonomously implementing a given activity. By "autonomous" it is meant that no human action is needed in performing this activity. The process definition 107 may identify or reference a given agent 120a to indicate which software entity is responsible for performing a given activity within the process definition 107. Each agent 120 receives and sends work items 117.

Database 125 is used for persistent storage. This may be used to store process definitions 107 and various objects. Under a preferred embodiment, work items 117 are stored in the database 125 after each activity is performed, and read from the database 125 each time a work item 117 is sent to an actor. Work item identifications (IDs) are used to address the items and to distinguish work items that belong to different workflows or to distinguish work items in the same flow, but at different activity stages.

Clients 130 are software entities that operate in conjunction with an end-user or "participant" (i.e., a person) rather than autonomously like an agent. This interaction with an end-user may occur through a generalized or customized GUI or application (e.g., "task manager logic").

Administration interface 140 allows a supervisor, i.e., a person, to manage the system as required.

LDAP services 150 provide directory services. These services are used for maintaining a centralized database of network users, who may or may not be users of the workflow system.

Certificate services 155 provide certificates which may be used for authentication, digital signing and corresponding security transactions.

Figure 2:
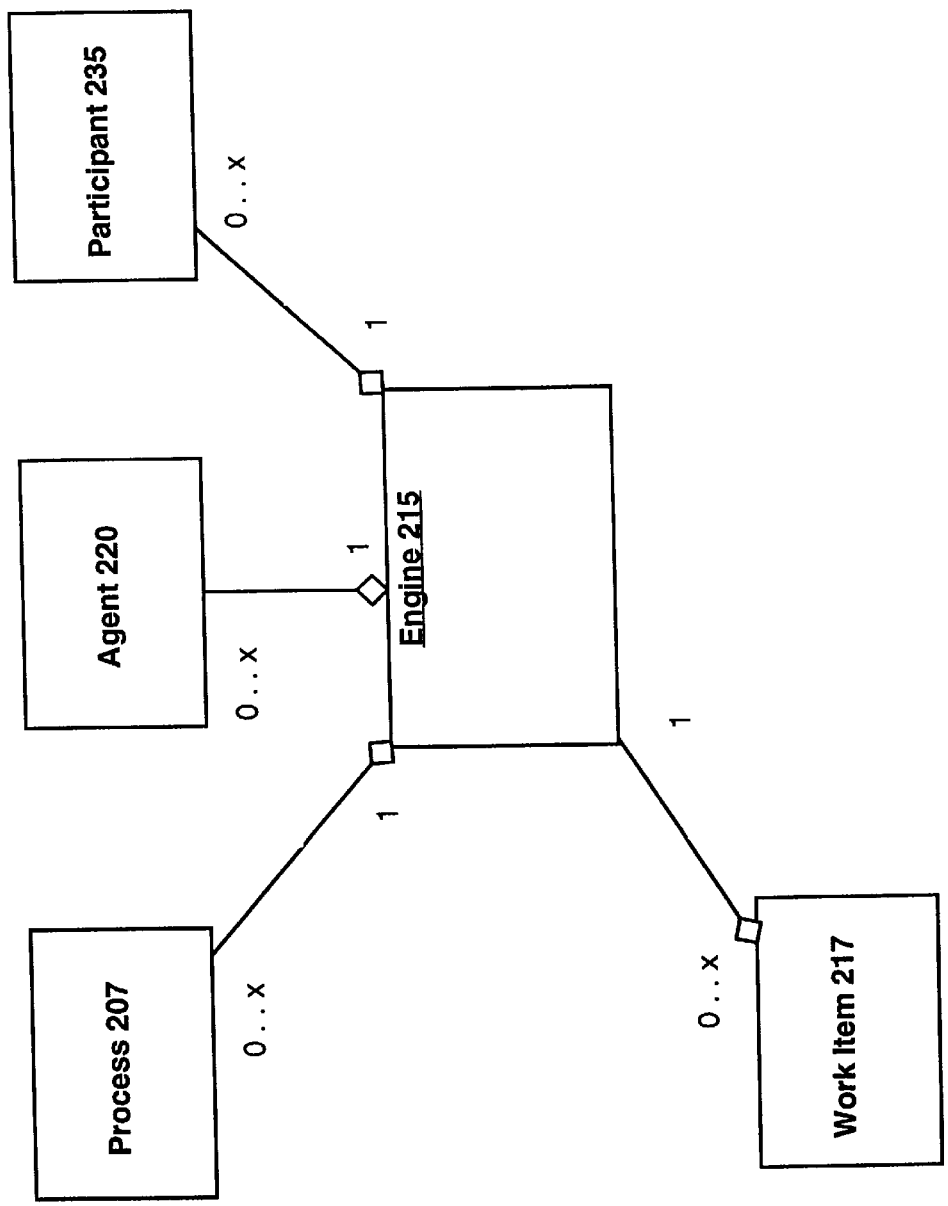
FIG. 2 is a Unified Modeling Language (UML) description of an exemplary flow engine object with associated objects.
Figure 8:
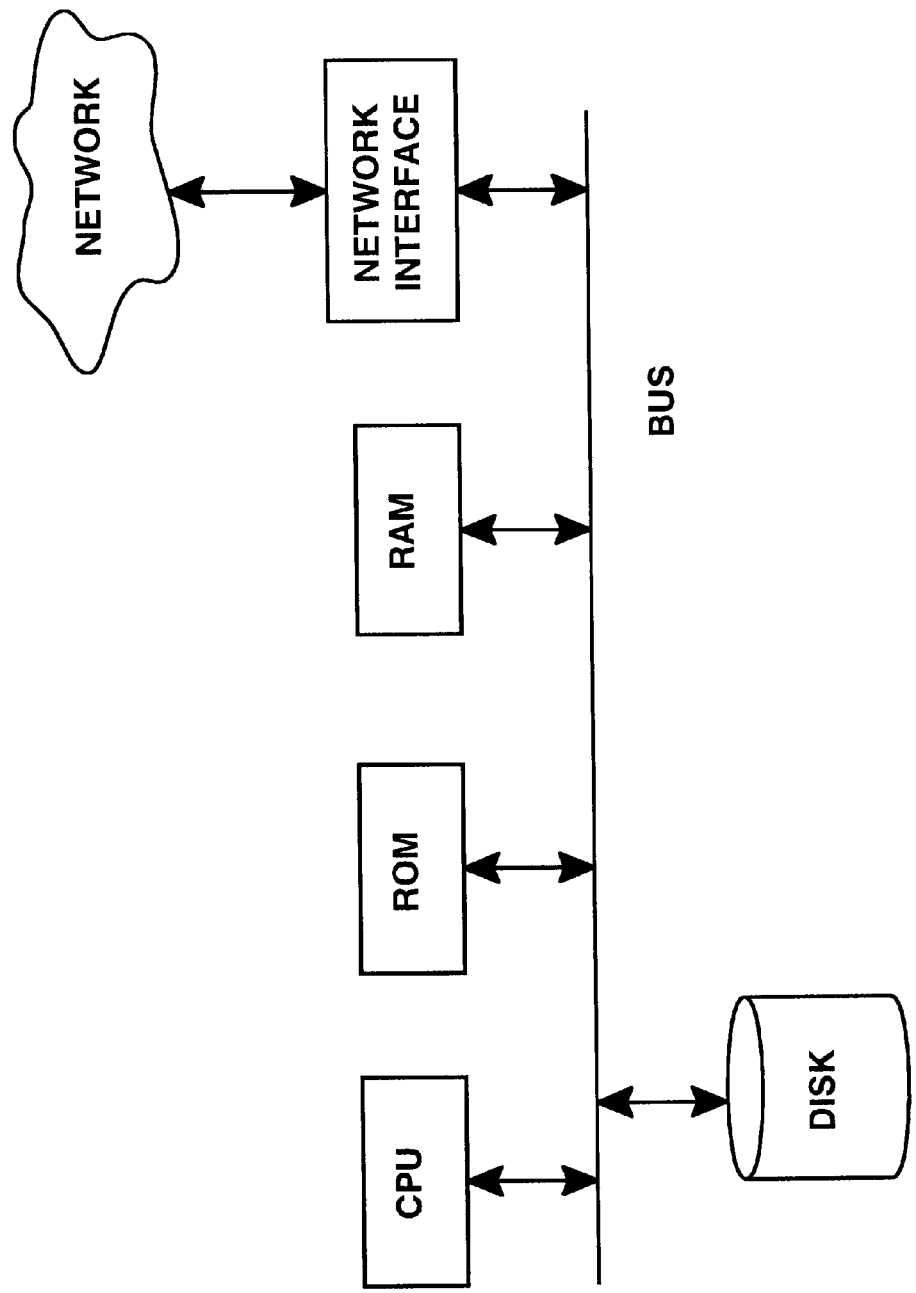
FIG. 8 illustrates an exemplary platform on which an exemplary server, client, or agent may operate.

Under a preferred embodiment, the server 110, the engines 115a–b, and certain aspects of the client 130 are implemented with the Java programming language (e.g., JDK 1.1). Likewise, though it is agent implementation-specific, the agents 120 may be implemented in Java. Using conventional Java programming techniques, a given workflow engine 115*a* is associated with other objects, as shown in the Unified Modeling Language (UML) description of FIG. 2. (UML is a notation known in the art) Specifically, engine 215 is associated with zero or more work items 217; zero or more process definitions 207 (e.g., subprocesses); zero or more agents 220; and zero or more participants 235. It may be further associated with a work group (not shown) in which several actors are grouped together for load balancing or other group-related functions. The flow engine 115 and server 110 interact with database 125, which is preferably implemented as an Object Database Management Group-compliant (ODMG-compliant database, available from Poet. The Poet database 125 is a multi-transaction and multi-threaded database that, among other things, provides Java bindings to facilitate persistence of the Java objects used in implementing the server 110 and engines 115. Java, being an interpretable language is processor independent. An exemplary platform on which it and thus the server, clients, and agents, may operate is shown in FIG. 8.

Under a preferred embodiment, work items 117 are implemented using Java, but extended to improve persistence via database 125. Preferred work item objects 117 include a Java hash table (discussed below) and may be extended, via subclassing, to have other properties and logic. These extensible objects may be used, for example, when objects are distributed to other servers.

Figure 3:
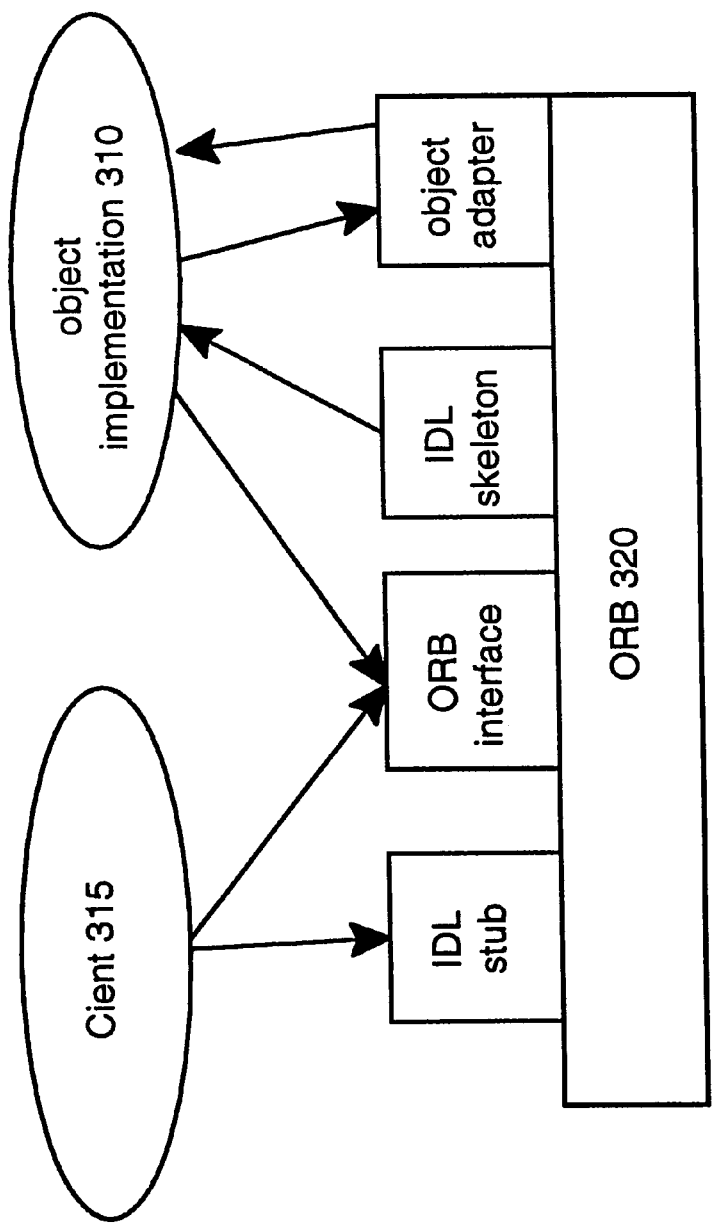
FIG. 3 is an architectural diagram illustrating the distribution of objects using an ORB.

A preferred embodiment of the server 110 distributes work item objects 117 between server 110 and clients 130, agents 120, and potentially other remote workflow servers (not shown in FIG. 1). This relationship is established using an object request broker (ORB) in accordance with the common object request broker architecture (CORBA). Under this relationship, as shown in FIG. 3, the server 110 contains the object implementation 310, and the client or the agents (collectively 315) have access mechanisms to that object implementation via the ORB 320. These access mechanisms are implemented with conventional techniques, for example, using the object management group's (OMG's) interface definition language (IDL). Though the object implementation is on the server 110, the object seems to reside locally both from the perspective of the actors and the server.

The preferred implementation instantiates only one process definition 107, which is used no matter how many workflows, defined by that process, are concurrently executing on server 110. The process definition 107 is effectively shared among the workflows and each flow is kept distinct through proper identification of the associated work items 117. This is in contrast to WfCM specifications which suggest a new "enactment" of a process definition for each workflow. The preferred arrangement, by sharing the definition 107, significantly reduces load on the server 110, thus allowing it to serve more workflows concurrently, and reduces storage requirements on database 125.

Figure 4:
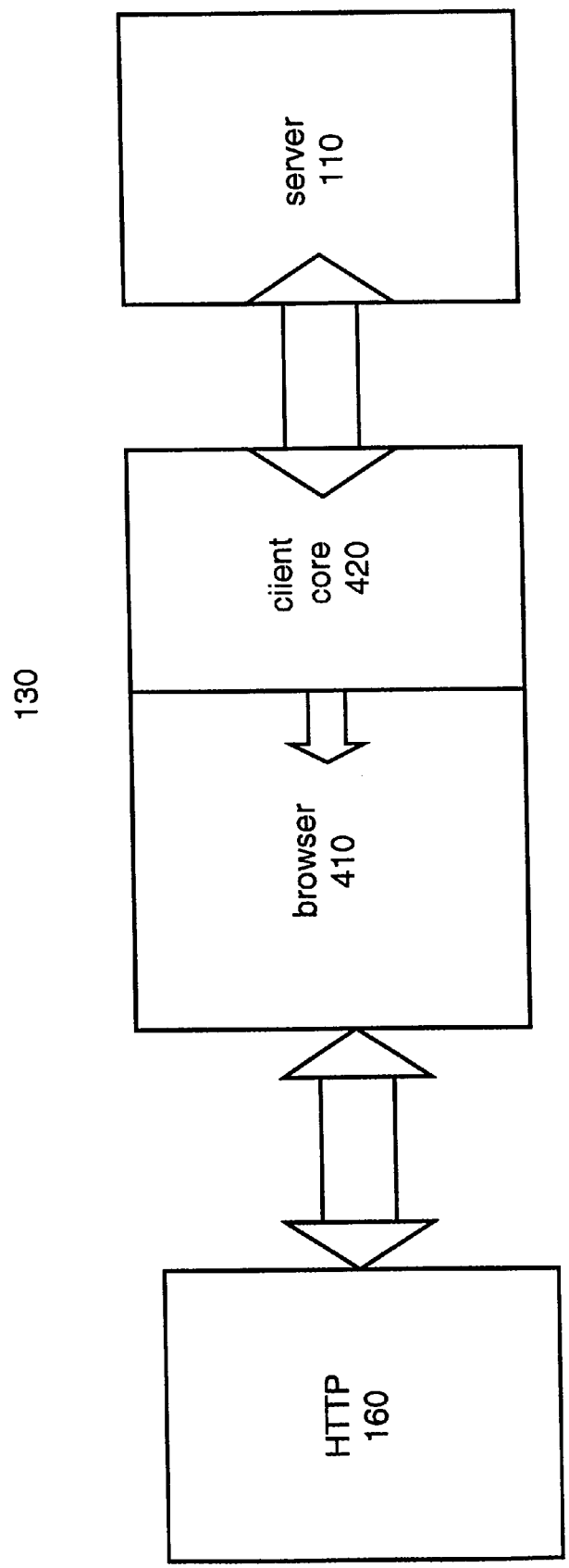
FIG. 4 is a system diagram of an exemplary client.

FIG. 4 illustrates a client 130 at a high level of abstraction. Client 130 includes a browser component 410 and a client core component 420. Under preferred embodiments, browser component 410 may be the Netscape browser 4.04. However, core component 420 is designed to run with any Java-compliant browser. The browser component 410 establishes or is caused to establish a context or environment in which the client core component 420 operates. For example, in the Netscape environment, conventional techniques (e.g., Live Connect) may be used to allow plug-ins, applets, and other components to communicate with one another via registered communication interests. Explorer has analogous features (e.g., Active X). The core component 420 would include task manager logic (not shown), for example, providing a GUI having an iconically-represented "in-box" of iconically-represented, to-be-completed work items.

2. Work Item Morphing

During the processing of a given workflow, as various activities are performed, work items are routed to the appropriate actors. The logic for scheduling such work items is discussed below in context.

Figure 6:
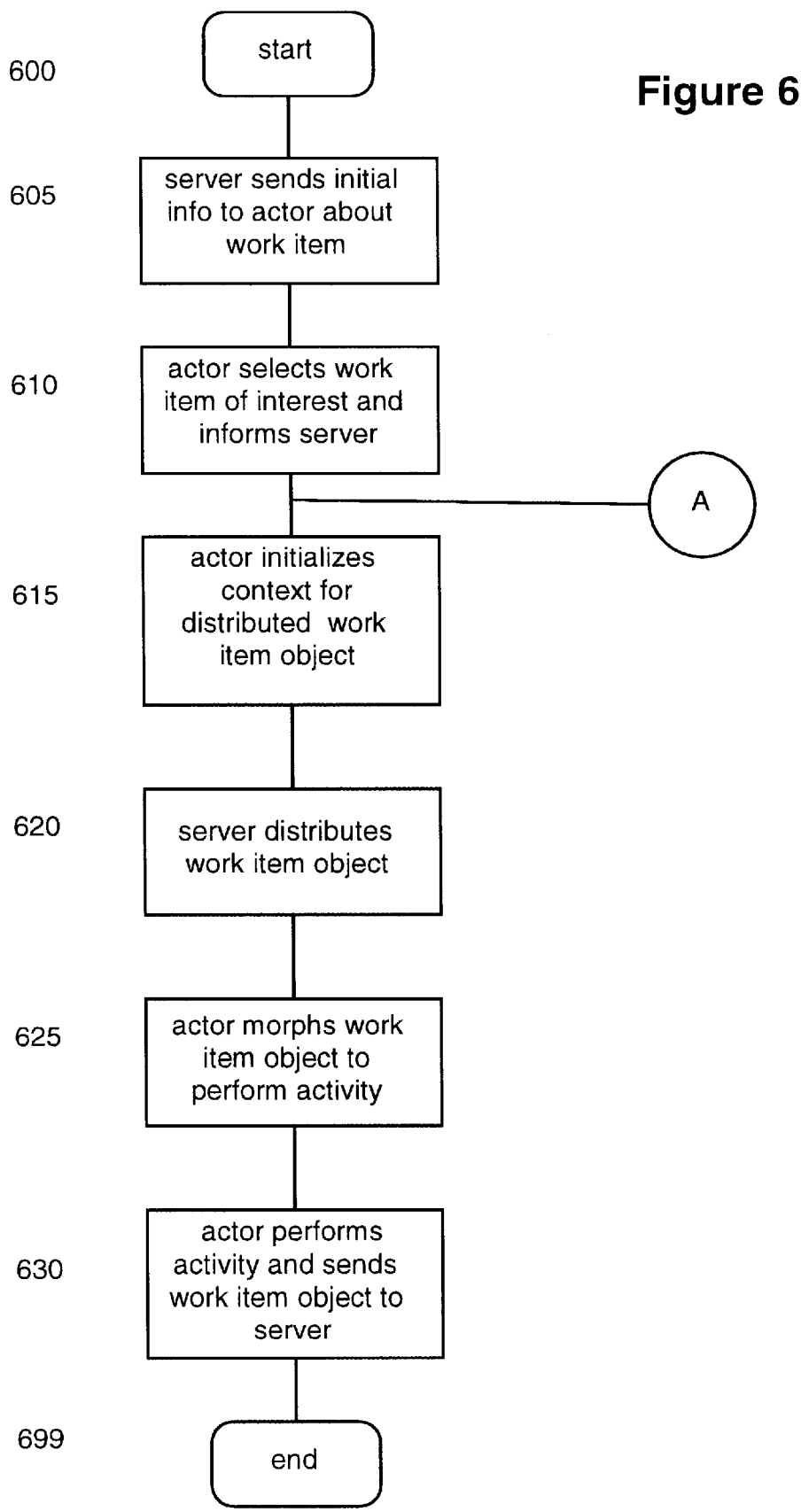
FIG. 6 is a flow chart showing exemplary logic for initiating an actor and morphing a work item.

The novel logic for causing an actor to perform an activity using morphed work items is shown in the flow chart of FIG. 6. The logic starts in step 600 and proceeds to step 605.

In step 605, the server 110 sends a work item event message to the client of interest 130 or agent of interest 120 indicating that a work item object 117 has been scheduled for that activity. Clients 130 (specifically task manager logic) and agent 120 each include conventional event listening logic which is registered with the server 110 to listen for new work item events. In response to receiving a new work item event, the actor requests from the server 110 a refresh of the actor's in-box. The server obtains the "in-box" information from the database 125 and sends it to the actor. The in-box information includes the names of the work items assigned to the actor (each work item being named using conventional naming techniques such as OQL which uniquely identify the work item and its stage of completion within the flow) and may include other work item-related information such as corresponding priority information, URL references to HTML pages, or the like. The work item-related information is determined from the engine 115, the definition 107, the state of the workflow, and the database 125.

Eventually, the actor selects a work item of interest from its in-box in step 610 indicating it's ready to begin the activity. The selection causes a selection message to be sent to the server 110 indicating that a given work item has been selected.

The actor, in step 615, initializes or establishes a context into which the work item object 117 may be distributed. (Though the various logic steps may be rearranged in many other sequences and remain operative, it warrants emphasis that step 615 could easily precede or operate concurrently with step 610.) The particular actions involved in establishing this context depend upon the type of actor, i.e., client or agent, and are discussed in later sections.

The server 110, in step 620, responds to the selection message, by causing that selected work item object to be distributed to the actor. Under preferred Java implementations this entails reading the object 117 from database 125 using its object identification and establishing Interoperable Object Reference (IOR)object references on the client 130 or agent 120 to reference an ORB which in turn references the object implementation of the work item object 117 on the server 10. (IOR object references are known.) This referencing is preferably established with an IDL description. The database 125 stores the objects 117 to provide object persistence. (Non-Java embodiments and perhaps future Java version having improved object persistence mechanisms may not need database operations.) Once distributed, the actor may create a local copy (not shown) of the object 117 to improve performance. However, in some situations, e.g., where the actor only needs to perform write operations, the actor may not need or benefit from a local copy, in which case it will just use the distributed version.

The actor, in step 625, may then morph the work item object 117, now distributed between actor and server 110, into a form needed by that particular actor. A preferred embodiment of the work item object 117 is implemented as a Java object that has a Java hash table of key/value pairs. ("Java hash tables" are known and should not be confused with conventional hash tables; for readers who are unfamiliar with Java hash tables, they may be thought of as an indexable map of vectors pointing to data.) With this preferred work item object, the morphing, step 625 entails selecting only the data of interest to that particular activity from the full set of data of the work item object 117. In this fashion, the particular applications associated with an actor may be developed concerning themselves only with the data of interest and not other data that may be in the object. For example, the application logic need not include filter logic to filter out data not needed by that activity. Moreover, the information that is eventually conveyed, for example, to a participant, need not be cluttered with irrelevant data. The workflow applications may thus be more easily designed for different workflow systems.

The actor performs the activity, in step 630, and "sends" or "saves" a work item object 117 to the server 110. In performing the activity, the actor application may have read or written data in the work item object 117 and even effectively changed the data type definition of the work item object. Specifically, the actor may alter or "set" the properties of the preferred work item object 117 by dynamically adding keys to the Java hash table associated with the preferred work item object 117. The "sending" of the object 117 does not actually send the whole object. Instead, sending entails updating or overlaying the data in the object implementation of the work item object 117 on server 110 and informing the server 110 that the actor has completed the activity. The server 110 may then update the database 125 with the "saved" work item. A preferred embodiment thus has the work item objects 117 at each stage of activity stored in database 125 with a unique object ID.

By way of example, a work item object 117 named XYZ, may be distributed to an actor. Assume the object has a hash table having three keys or fields: name, address, and employment position. Each field may already have a value or may be undefined. Assume further that the actor to which the object 117 is distributed has a corresponding application, whether in the form of agent or client-related logic, that only needs to consider a name and an address. Transparently to the actor application, only the name and address keys are selected and provided to the actor application. The actor application is completely abstracted from knowing that the work item object 117 actually contained a key for "employment position" and never needed to take any action on such data. Because of this unique morphing, if the very same application logic were "reused" in a different workflow, one in which the work item objects 117 contained name, address, and new keys neighbor's name, etc. the application logic would still work without any modification, providing a measure of workflow independence to the actor applications. Referring back to the example of work item object XYZ, the actor application as part of performing its activity may add a new key to the object that that actor created, for example, a field "sales prospects." This addition of a new field may be performed using conventional update techniques to the Java hash table using the CORBA interface, but the result of the extensible work item object is completely new.

The logic then proceeds to step 699 which ends the activity. The server 110 and flow engine 115 would now cooperate with the actor to determine whether subsequent activity is needed and if so schedule such subsequent activity accordingly. Under a preferred embodiment, a client asks the flow engine 115 for the set of possible next activities. The flow engine 115 interprets the definition 107, along with other information stated above, and sends the set to the client. The client then decides which activity should be selected next from the above. This may be performed by a participant selecting certain controls on a GUI. The client then builds and associates a "routing slip" (not shown) to be associated with the work item 117, and the server 110 utilizes the routing slip to determine which activity should receive new work item events to trigger activity, as described above with regard to FIG. 6. Under a preferred embodiment, the server 110 makes scheduling decisions when the actor is an agent. However, under alternative embodiments, the agent could make scheduling decisions in software logic. As stated above, the work item 117 has been stored in database 125 with an ID that uniquely identifies the work item 117 at a given completion stage of activity. This ID is used in sending the new work item event to a subsequent activity and in refreshing the in-box of a subsequent actor. This scheduling and routing would continue until the workflow is completed as defined by the process definition.

3. Morphing Work Item Objects in HTML-based Client Applications

A preferred embodiment of the invention includes HTML-based client applications. These applications may be inter-, extra- or intra-net based, depending on the workflow system's needs. Under this embodiment, the workflow system may leverage the wider availability of the Internet and the increasingly well known and desired "look and feel" of Internet browser-based systems.

Figure 7:
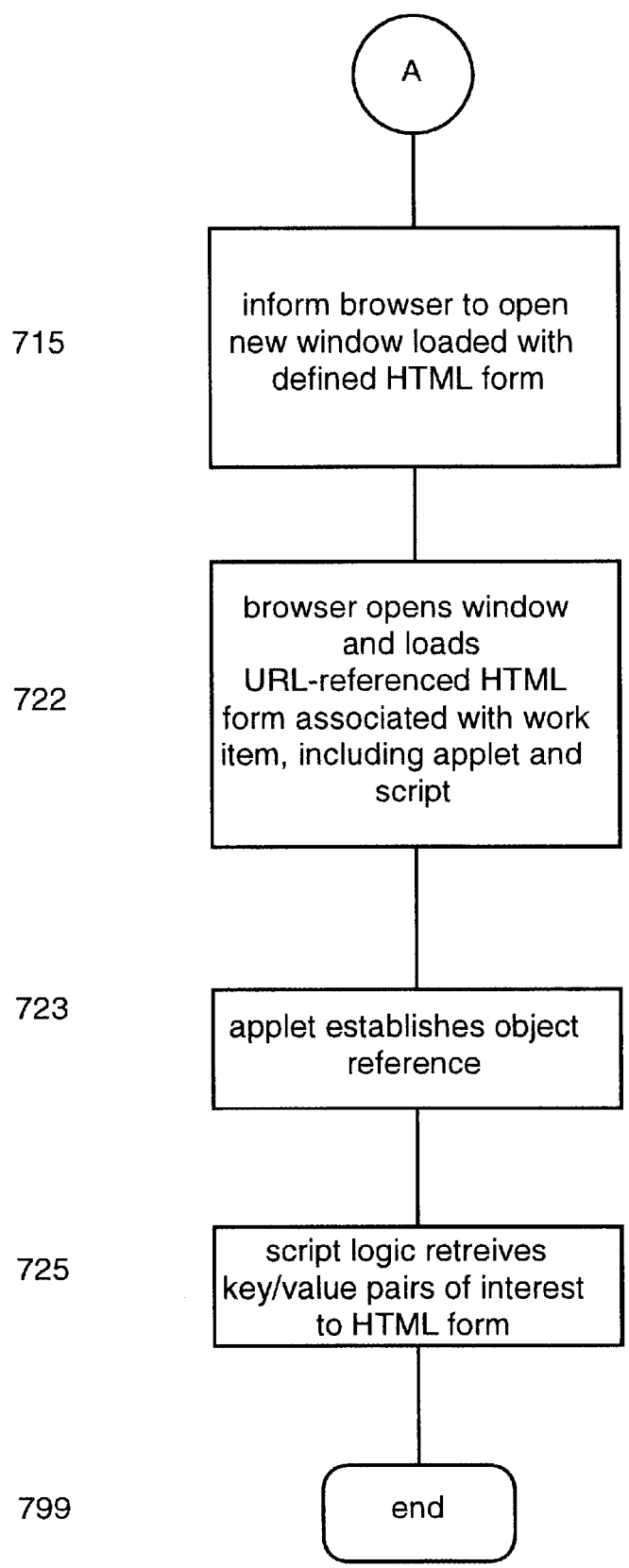
FIG. 7 is a flow chart showing exemplary logic, supplemental to the logic of FIG. 6, for initiating an HTML-based client application that morphs a work item.

In this context, the task manager logic, discussed above, is preferably implemented as a Java applet operating in conjunction with a Java compatible browser 410. The logic of FIG. 6 is still applicable, but the logic of FIG. 7 is more specific to this specific form of HTML-based client application and supplements the description of FIG. 6. FIG. 7 starts the flow at break point A. (The steps 605 and 610 are the same as in FIG. 6, but may involve task manager-specific iconic manipulations that are not material to understanding the "morphing.")

Figure 5A:
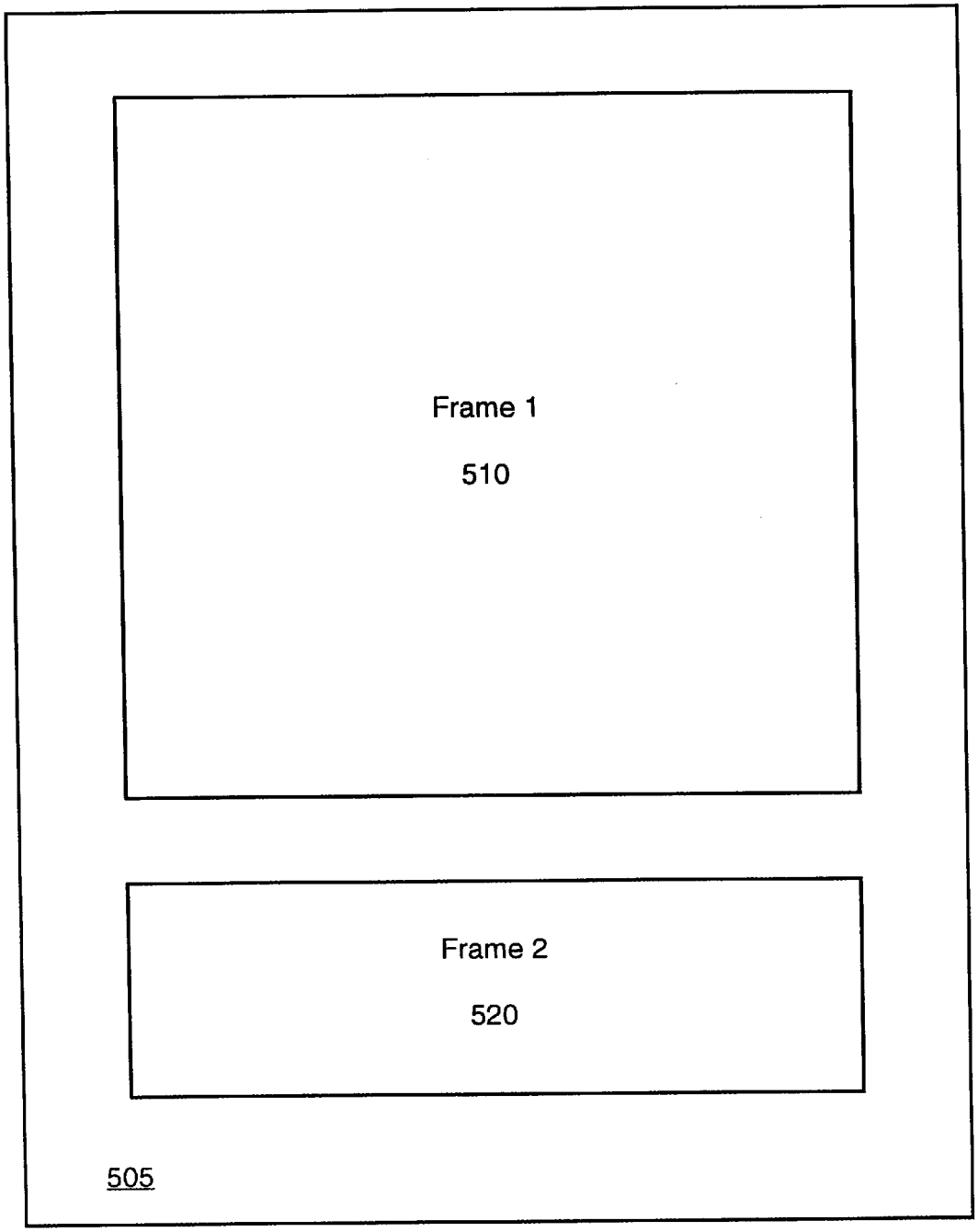
FIG. 5A shows the architecture of an exemplary predefined HTML page used by exemplary embodiments of the invention.

In step 715, the task manager logic instructs the browser 410 to open a new browser window and to load the window with a predefined HTML page. FIG. 5A shows an exemplary structure of the predefined page 505 having two frames 510 and 520. This step supplements the initialization step 615.

Figure 5B:
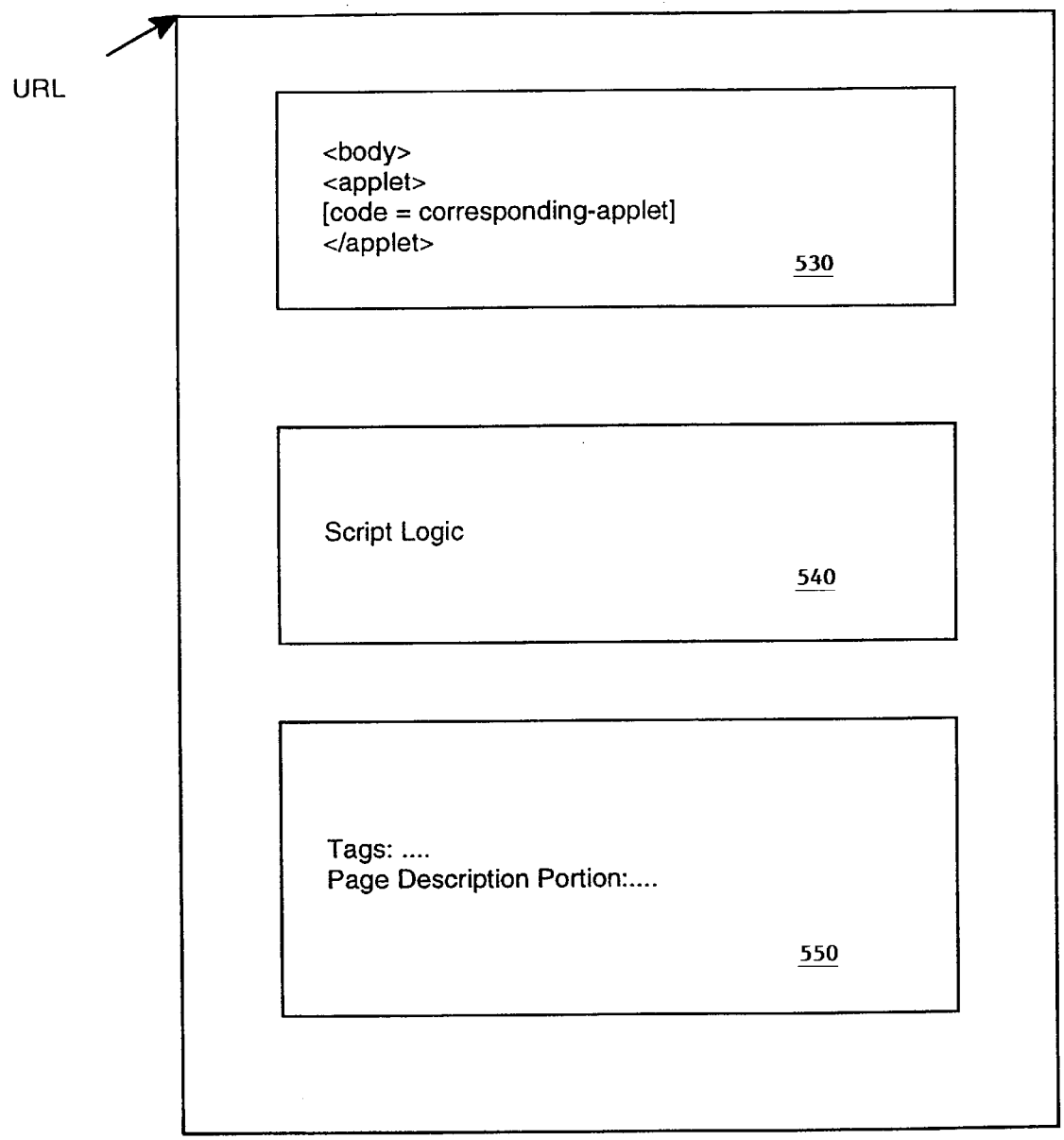
FIG. 5B shows an exemplary HTML page structure that may be used in constructing exemplary HTML-based client applications to be used with exemplary embodiments of the invention.

Eventually, the logic progresses to step 722 by which time the task manager logic has learned of information associated with the work item 117 of interest. In a preferred embodiment, this associated information was supplied in step 605. Part of the associated information includes a URL reference to an HTML page that corresponds to the client application for the activity being performed. (This association of an HTML page and application is made when defining the process definition.) Referring to FIG. 5B, the URL-referenced page includes a reference to a predefined applet 530, Java script logic 540, and a HTML page description 550 having various HTML "tags" and other HTML components. The predefined applet, referenced by 530, is loaded in one frame, e.g., 520, of the predefined page 505, and the page description and script logic 540 are loaded in the other frame, e.g., 510.

Under a preferred embodiment, the predefined applet referenced by 530 is supplied as part of the system and includes the logic for the various application controls. The actual controls are implementation specific, but will likely at least include "save" and "send" controls, respectively, to save a work item to database 125 and to indicate that a subsequent activity should be scheduled. The applet 530 further includes the logic for communicating with the work item object 117 that is eventually distributed. This logic uses conventional techniques to establish the various IOR object references for the CORBA-based communication. The applet 530 would further include logic for creating and maintaining a local copy of the object 117.

The object 117 is eventually distributed (see step 620), and in step 723 the predefined applet establishes the object references, mentioned above. The preferred embodiment of a work item 117 is a distributed Java object having a Java hash table as a component to contain the "contents" of the work item. The interface to the work item object includes "get" and "set" methods to the indexable hash table, for example, to obtain or set the list of keys or to obtain or get a particular key with a value.

The script logic 540, which is preferably written in Java script, is invoked and interpreted as part of the normal page loading. This script logic 540 uses conventional techniques to iterate over the HTML tags in the HTML portion 550 to determine the tags that the HTML portion needs. Typically, applications will be developed so that these tags correspond to displayed entities in the displayed HTML frame, e.g., 510. Referring back to the above example of work item object XYZ, the script logic 540 would iterate over the tags and learn that the HTML portion needed tags called "name" and "address."

In step 725, the script logic 540 determines the tags used by the HTML portion 550 to be displayed in frame 520, and uses the tag names as the keys or indexes to the Java hash table of the work item object 117. Specifically, the script logic 540 iterates through each tag of the HTML page and uses the tag as key to the Java hash table to retrieve the corresponding value of the key/value pair. The retrieved value is displayed in the HTML frame 520 as specified by the HTML portion 550, and the eventually displayed information is used by the participant in some activity-dependent manner. For example, the participant may write to certain of the fields of the displayed page, or add values to displayed fields that have not yet been added to the work item object 117.

The activity is eventually performed and the completion is signalled by activating a save or send control displayed in HTML frame 510. This save and send causes a message to be sent to the server 110 which will then cause the database 125 to be modified by the work item contents of the work item object 117.

The client-based HTML application then ends in step 799 and the workflow progresses as outlined above.

The preferred system includes HTML templates that include default control logic, applet 530, and default Java script 540. In this fashion, developers need only concentrate on the HTML display portion 550 and any associated application-specific logic.

The preferred embodiment thus morphs work items 117 in the sense that they present work item data that is needed by a client 120 regardless of the data in the actual object 117. Moreover, by using different HTML displays the types of "forms" thus created from the workflow system and perceived by a participant appear as changes in type. (This does not imply that the data type associated with object 117 has changed.)

4. Morphine Work Item Obyects in Agent-based Applications

Software agents operate analogously to that described above, except that there is no need for the HTML displays because agents operate autonomously and do not involve participant interaction. The work item objects 117 are distributed analogously. The agents could be "self-defining" to describe which keys it is interested in. Default Java logic may determine which keys are of interest and morph the work item objects analogously to that described above. In this fashion, the developers need only concern themselves with the agent-specific functionality.

5. Other Embodiments

The above embodiment largely focused on implementations that used object-oriented design, and particularly Java implementations. Though these embodiments provide certain advantages non-object-oriented techniques may be employed effectively, such as linear programming.

Likewise, Java is interpreted at run-time, not pre-compiled, into native mode instructions for the particular computing platform. Nonetheless, though Java offers platform independence, implementations that are platform specific or that are implemented with executable native mode instructions may be employed effectively.

The storing of work objects within the database provides certain advantages by way of object persistence. Certain languages and environments, however, have satisfactory persistence and these systems may be employed effectively without requiring as many transactions to the database.

Clients were discussed with particular emphasis on implementations using HTML pages. Nonetheless, many other client arrangements may be provided with effective user interfaces that do not use HTML-based displays.

Many other architectures may be used for the routing of work items, for example, ones in which the engine performs all scheduling activities rather than cooperating with actors.

Moreover, though reference was made to WfMC specifications, there is no requirement or inherent limitation to implementing systems according to the WfMC specifications. In fact, embodiments were described that differed from the specification in material ways, e.g., shared engines among workflows.

Having described an exemplary embodiment, it should be apparent to persons of ordinary skill in the art that changes may be made to the embodiment described without departing from the spirit and scope of the invention.

What is claimed is:

1. A workflow system for distributing work items to actors so that the actors may perform an activity within a defined workflow process, the system comprising:

a server for interpreting the workflow process and facilitating the scheduling and routing of work items in the system to an actor, wherein each work item has a set of work item contents data; and morphing logic to determine which data is needed by an actor to which a work item has been scheduled and to morph a work item so that the actor receives only the data from the work item contents that the actor needs, wherein the actor is client logic that cooperates with a participant to perform an activity in the defined workflow process, and wherein the client logic includes logic to cooperate with a browser to cause the browser to display an HTML page associated with the activity performed by the client logic, and wherein the client logic includes logic to iterate over the HTML page to learn what data is needed by the HTML page.

2. The system of claim 1 wherein the work item is a Java object distributed between the server and the client and wherein the work items contents data comprises a Java hash table of key value pairs.

3. The system of claim 2 wherein the logic to iterate detects tags in the HTML page and uses the detected tags as a key to retrieve data from the Java hash table so that the retrieved data may be displayed in the HTML page.

4. The system of claim 1 wherein the client logic includes logic to cause a browser to open a new browser window and to load a predefined HTML page, having two frames in the page, in the new browser window, and wherein the HTML page associated with the activity performed by the client logic is loaded into one of the two frames of the predefined HTML page.

5. The system of claim 1 wherein the work item routed to an actor includes a reference to the HTML page associated with the activity and wherein this reference is used to load the HTML page associated with the activity.

6. A method of distributing work items to actors in a workflow system so that the actors may perform an activity within a defined workflow process, comprising:

scheduling and routing a work item in the system to an actor, wherein each work item has a set of work item contents data; and morphing the work item by determining which data is needed by an actor to which the work item has been scheduled and providing to the actor only the data from the work item contents that the actor needs, wherein the actor is a client and wherein the method further comprises causing a browser to display an HTML page associated with an activity that is to be performed by the client and wherein the client iterates over the HTML page to learn what data is needed by the HTML page.

7. The method of claim 6 wherein the work item is a Java object distribute between a server and the client and wherein the work items contents data comprises a Java hash table of key value pairs, and wherein the method further comprises detecting tags in the HTML page and using the detected tags as a key to retrieve data from the Java hash table so that the retrieved data may be displayed in the HTML page.

8. The method of claim 1 wherein the client causes a browser to open a new browser window and to load a predefined HTML page, having two frames in the page, in the new browser window, and wherein the HTML page associated with the activity performed by the client is loaded into one of the two frames of the predefined HTML page.

9. The method of claim 6 wherein the work item routed to an actor includes a reference to the HTML page associated with the activity and wherein this reference is used to load the HTML page associated with the activity.

10. A set of computer processable instructions on a computer readable medium, including:

server instructions for interpreting a defined workflow process and facilitating the scheduling and routing of work items to an actor so that the actors may perform an activity within the defined workflow process, wherein each work item has a set of work item contents data; and morphing instructions to determine which data is needed by an actor to which a work item has been scheduled and to morph a work item so that the actor receives only the data from the work item contents that the actor needs, wherein the server instructions and the morphing instructions are implemented in run-time interpretable instructions, and wherein the run-time interpretable instructions include instructions to operate in one of a browser environment or browser context.

11. A set of computer processable instructions on a computer readable medium, including:

server instructions for interpreting a defined workflow process and facilitating the scheduling and routing of work items to an actor so that the actors may perform an activity within the defined workflow process, wherein each work item has a set of work item contents data; and morphing instructions to determine which data is needed by an actor to which a work item has been scheduled and to morph a work item so that the actor receives only the data from the work item contents that the actor needs, wherein the client instructions include instructions to cause a browser to display an HTML page associated with the activity performed by the client instructions and wherein the client instructions include instructions to iterate over the HTML page to learn what data is needed by the HTML page.

12. The set of computer processable instructions of claim 11 wherein the client instructions include instructions to cause a browser to open a new browser window and to load a predefined HTML page, having two frames in the page, in the new browser window, and wherein the HTML page associated with the activity performed by the client instructions is loaded into one of the two frames of the predefined HTML page.

13. A set of computer processable instructions on a computer readable medium, including:

server instructions for interpreting a defined workflow process and facilitating the scheduling and routing of work items to an actor so that the actors may perform an activity within the defined workflow process, wherein each work item has a set of work item contents data; and morphing instructions to determine which data is needed by an actor to which a work item has been scheduled and to morph a work item so that the actor receives only the data from the work item contents that the actor needs, wherein the work item is a Java object and wherein the work items contents data comprises a Java hash table of key value pairs.

14. The set of computer processable instructions of claim 13 wherein the morphing instructions include instructions to detect tags in the HTML page and to use the detected tags as a key to retrieve data from the Java hash table so that the retrieved data may be displayed in the HTML page.

15. A method of distributing work items to actors in a workflow system so that the actors may perform an activity within a defined workflow process, comprising:

scheduling and routing a work item in the system to an actor, utilizing CORBA, wherein each work item has a set of work item contents data;

morphing the work item by determining which data is needed by an actor to which the work item has been scheduled and providing to the actor only the data from the work item contents that the actor needs, wherein the actor includes logic to query a server for a set of possible next actors that may be scheduled, wherein the actor includes logic to select from the set of next possible actors and to inform the server of the selection, and wherein the server includes logic to notify the selected actor that a work item has been scheduled to the selected actor, and wherein the server constructs a work item ID that uniquely identifies a work item at a stage of completion for an activity within the process.

* * * * *